United States Patent

[11] 3,617,898

[72] Inventors Eugene A. Janning, Jr.
West Chester, Ohio;
[21] Appl. No. 814,772
[22] Filed Apr. 9, 1969
[45] Patented Nov. 2, 1971
[73] Assignee Avco Corporation, Cincinnati, Ohio

[54] ORTHOGONAL PASSIVE FREQUENCY CONVERTER WITH CONTROL PORT AND SIGNAL PORT
1 Claim, 6 Drawing Figs.

[52] U.S. Cl. ........ 325/451, 321/60
[51] Int. Cl. ........ H04b 1/26
[50] Field of Search ........ 325/430, 451; 307/88.3, 304; 330/4.5, 4.9; 321/60; 328/156

[56] References Cited
UNITED STATES PATENTS

| | | | |
|---|---|---|---|
| 3,204,240 | 8/1965 | McKay | 343/100 |
| 3,348,154 | 10/1967 | Fish | 325/451 |

*Primary Examiner*—Robert L. Griffin
*Assistant Examiner*—Kenneth W. Weinstein
*Attorney*—Charles M. Hogan

ABSTRACT: A field effect transistor is so arranged that a radio frequency input signal is applied to a signal port, comprising the source drain circuit. A local oscillator applies the locally generated oscillations to the control port, comprising the gate and source electrodes. The combination is operated as an orthogonally pumped resistive mixer. The resistive nonlinearity of the signal port is controlled only by the local oscillator pump signal voltage applied to the control port.

INVENTOR.
EUGENE A. JANNING, JR.
BY Charles M. Hogan
ATTORNEY.

ORTHOGONAL PASSIVE FREQUENCY CONVERTER WITH CONTROL PORT AND SIGNAL PORT

BACKGROUND OF THE INVENTION

Radio reception in accordance with the superheterodyne principle generally exploits one of two principal methods for obtaining passive frequency conversion. One of these methods involves the use of a nonlinear resistive element such as a diode. The other involves the use of a nonlinear reactive element, as in a parametric mixer. In general, the nonlinearity of the element is modulated by a local oscillator signal (pump signal) in order to convert the incoming radiofrequency signal to the desired intermediate frequency signal. However, due to the nonlinear nature of the mixing element cross modulation products are generated, causing spurious responses.

The usual method employed for the reduction of spurious responses is "swamping out." That is, the pump signal is made so strong with respect to the radiofrequency signal that the pump signal exercises dominant control over the nonlinearity. Since the mixer elements commonly used are one-port (two terminal) devices both the local oscillator and the radiofrequency signals are applied to a common port. The local oscillator is operated at a relatively high power so that it captures control.

A primary object of the invention is to provide a passive frequency converter which accomplishes very low cross modulation and relative freedom from spurious responses even when the local oscillator power is substantially less than the radiofrequency signal power. The invention accomplishes this result, with concomitant savings in power consumption, size and weight.

Another object of the invention is to provide a passive frequency converter characterized by a substantial reduction in spurious responses.

The orthogonal mixer of the present invention represents a new concept in frequency conversion and is believed to approach more closely to the ideal mixer than the prior art. The ideal mixer would be passive and would require no direct current power. It would have no gain, but the loss would be very small. Because such a mixer would be passive and have no gain, it would theoretically require no local oscillator power, regardless of the magnitude of the input signals. The ideal mixer would be linear and would generate no spurious products or intermodulation. The ideal mixer would contain no excess noise generators.

The mixer is accordance with the invention approaches this ideal case. It is passive and requires no DC power. It has a 4 db. insertion loss. It requires very little pump power (10 milliwatts at 200 megahertz, for example), yet handles input signals of up to ¼watt with only 1 db. of compression. All spurious responses of second order or greater in the input signal are rejected a minimum of 80 db. (1 microvolt reference). The intermodulation due to representative input signals is down 80 db. The mixer in accordance with the invention contains no excess-noise generators and thus the noise figure is equal to the insertion loss as for any passive attenuator.

The invention differs from other mixers in that the pump and input signals are not superimposed across a nonlinearity, but enter the mixing element through orthogonal ports. In diode mixers or parametric amplifiers the pump and input signals are necessarily superimposed across the nonlinearity, since diodes and varactors are one-port (two terminal) devices. Thus to maintain a reasonable degree of linearity the pump signal must be much larger than the input signal to insure that the pump controls or "captures" the nonlinearity. The pump is normally 15 to 20 db. higher than the input signal. Thus to match the performance of my novel mixer, a conventional mixer would require at least 10 watts of pump power instead of the 10 milliwatts required by my novel mixer.

In prior art converters of the types using diodes and varactors, the one-port approach was used, because these were two terminal devices, both the incoming signal and the locally generated signal being applied to the same port. Even when a MOSFET transistor was used as a converter element, the same port was again used for both purposes, so strong has been this tradition in the art or the mixer was made active by the application of DC power. However, according to the present invention the principle of orthogonality is appreciated and utilized. That is, a second port or "control" port of the field effect transistor is utilized so that the impedance nonlinearity of the signal port is entirely a function of signals applied to the control port and is not affected by signals applied to the signal port. Therefore the cross modulation products are minimized.

The key concept of the invention is that of an orthogonally pumped resistive mixer. The resistance between the signal port terminals is controlled by a voltage applied between the terminals of the control port and is independent of the voltage or current applied at the signal port. Therefore the resistive nonlinearity of the signal port is controlled solely by the local oscillator signal voltage applied to the control port. No direct current voltage need be applied to a transistor when utilized in this manner, since the transistor is passive. Either an insulated-gate-type field effect transistor or a junction-type field effect transistor is suitable for this application. The oscillator power required at the control port is a function of the leakage resistance of the gate circuit. In the case of the insulated gate field effect transistor, the gate leakage resistance is typically $10^{12}$ ohms at low frequencies, so that the local oscillator or pump power required is extremely small.

DETAILED DESCRIPTION OF THE DRAWINGS

For a better understanding of the invention, together with other and further objects, advantages and capabilities of the invention, reference is made to the following description of the appended drawings, in which.

DETAILED DESCRIPTION OF A PREFERRED

Embodiment of the Invention

Figures 1, 2, 3, 4, 5, 6:
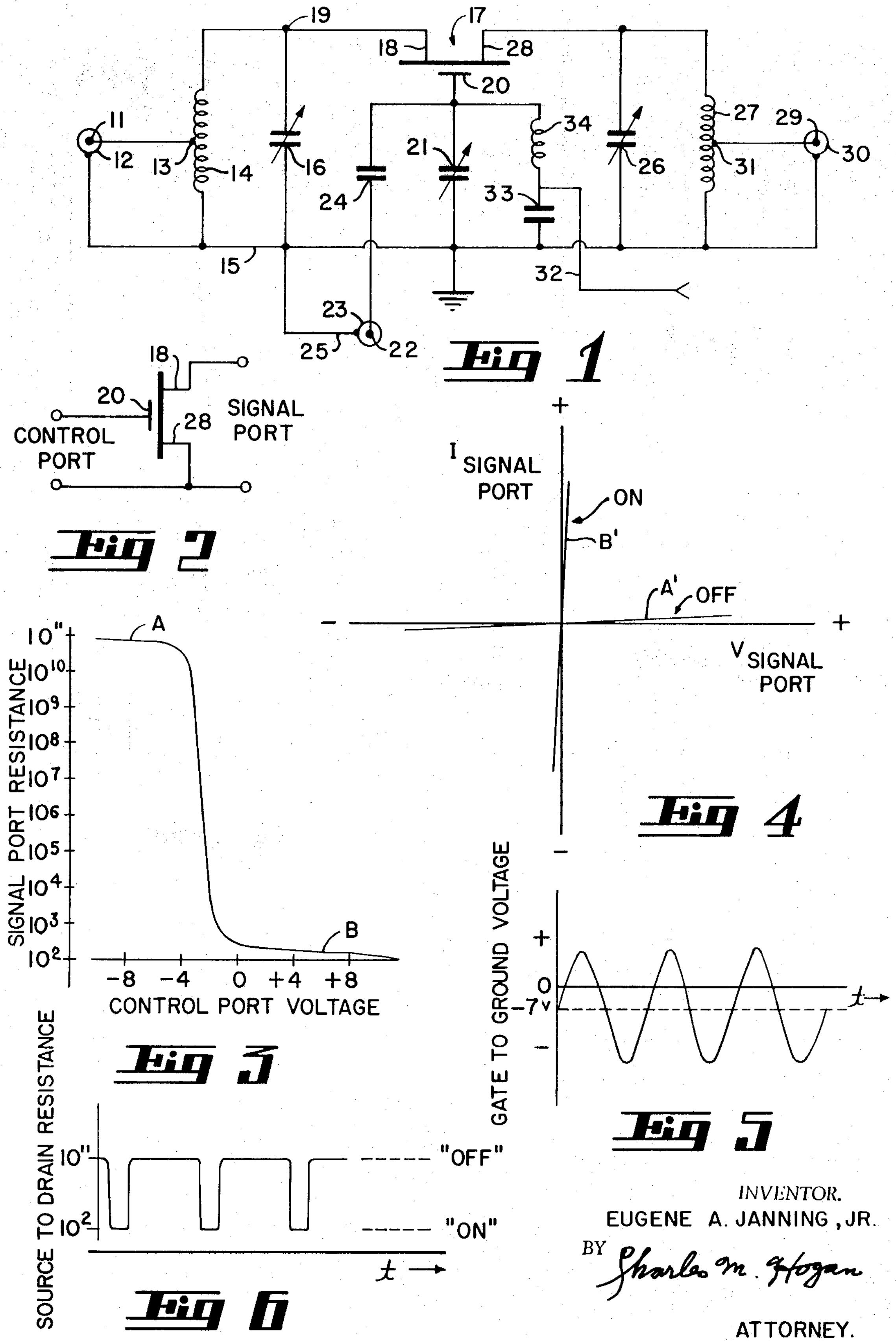
FIG. 1 is a circuit schematic of a preferred form of the mixer in accordance with the invention.
FIG. 2 is a simplified circuit equivalent diagram of a field effect transistor used as a mixer, in accordance with the invention.
FIG. 3 is a graph of signal port resistance values as ordinates versus control port voltage values as abscissae on a framework of Cartesian coordinates.
FIG. 4 shows signal port resistance values for the "off" and "on" conditions of the signal port.
FIGS. 5 and 6 are plotted against a time base, FIG. 5 showing gate-to-ground voltage values and FIG. 6 showing corresponding source-to-drain resistance values.

The preferred embodiment of mixer is illustrated in FIG. 1. The radiofrequency input terminals 11 and 12 are connected, respectively, to tap 13 on inductance 14 and to grounded line 15. Inductance 14 is in parallel with trimmer capacitor 16 to comprise therewith a tuned circuit parallel tuned to the radio frequency input frequency. A metallic oxide semiconductor field effect transistor 17 has a source electrode 18 connected to the high potential terminal 19 of this tuned circuit and the gate electrode 20 is RF (i.e. radiofrequency) grounded by a trimmer capacitor 21. The output terminals 22 and 23 of a source of local oscillations are coupled to the gate electrode 20 and ground, respectively, by an impedance matching capacitor 24 and a direct conductive connection 25, respectively. A resonant circuit comprising trimmer capacitor 26 and inductance 27 is tuned to the desired intermediate frequency and this tuned circuit is connected between the drain electrode 28 and ground. The intermediate frequency output terminals are shown at 29 and 30, the latter being grounded and terminal 29 being connected to a tap 31 on the output inductance 27. A negative bias is applied to gate electrode 20 from a suitable source, not shown, through a conductive connection 32, a shunt capacitor 33 and a series inductor 34, forming a resonant circuit at the local oscillator frequency with capacitor 24 and trimmer capacitor 21.

Suitable parameters for the FIG. 1 circuit are as follows:

| | |
|---|---|
| Transistor 17 | Type 3N138, insulated gate |
| Inductance 14 | 0.36 microhenry, turns ratio 4.4–1 |
| Inductance 34 | 0.043 microhenry |
| Inductance 27 | 0.091 microhenry, turns ratio 4.4–1 |
| Capacitor 16 | 9 to 35 picofarad, trimmer capacitor |
| Capacitor 24 | 2.5 picofarad |
| Capacitor 21 | 3 to 10 picofarad, trimmer capacitor |
| Capacitor 33 | 220 picofarad |
| Capacitor 26 | 3 to 12 picofarad, trimmer capacitor |
| Radiofrequency Source | 50 ohms output, 53 megahertz |
| Intermediate Frequency Output | 50 ohms, 160 megahertz |

In this circuit the transistor 17 serves as an interrupter or a sampling switch between the input and output tuned circuits. The inductance 34 and capacitors 24, 21 and 32 form the local oscillator pump and bias circuitry for the gate 20. Capacitor 24 provides an impedance match to the source impedance of the local oscillator. Capacitor 33 is a bypass capacitor used as the alternating current ground return for inductance 34.

The mixer is operated as a sampling-type low-duty cycle mixer, a negative bias voltage of minus 7 volts being applied to the gate 20. The transistor 17 switches from an "off" condition to an "on" condition as the positive-going gate voltage waveform exceeds approximately minus 2 volts.

Reference is made to the curves of FIGS. 5 and 6. Parenthetically, it will be noted that the transistor 17 is of symmetrical construction, the drain and source connections being interchangeable. It will be noted from the curves of FIGS. 5 and 6 that when the gate to ground voltage cyclically becomes more positive than +2 volts, the source to drain resistance drops from approximately $10^{11}$ to $10^{2}$ ohms. The power required to accomplish this transition is very small.

Now making reference to the curves of FIGS. 3 and 4, FIG. 3 shows the drop in signal port resistance produced by an increment in control port voltage. Portions A and B of the curves of FIG. 3 correspond respectively to portions A′ and B′ of the curves of FIG. 4. That is, B′ is the "on" resistance curve. FIG. 3 shows that very little power is consumed in the transition between high-signal port resistance and low-signal port resistance.

While there has been shown and described what is at present considered to be the preferred embodiment of the invention it will be understood by those skilled in the art that various changes and modifications may be made therein without departing from the scope of the invention as defined by the appended claims.

Having described my invention, I claim:

1. A passive frequency converter comprising, in combination:

a passive frequency converter device comprising a field effect transistor having a gate electrode constituting a control port and source and drain electrodes constituting a signal port, means for applying radiofrequency signals to the signal port, and means for applying local oscillations to the control port, said converter being orthogonal in that said radiofrequency signals and said local oscillations are not intermingled.

said source and drain electrodes being at the same direct current potential so that the signal port draws no DC power.

* * * * *